United States Patent [19]
Nuang

[11] Patent Number: 5,901,258
[45] Date of Patent: May 4, 1999

[54] WAVEGUIDE-TYPE OPTICAL ISOLATOR AND METHOD FOR MAKING THE SAME

[75] Inventor: Yidong Nuang, Tokyo, Japan

[73] Assignee: NEC Corporation, Tokyo, Japan

[21] Appl. No.: 08/829,917

[22] Filed: Mar. 28, 1997

[30] Foreign Application Priority Data

Mar. 29, 1996 [JP] Japan .................................... 8-077219

[51] Int. Cl.⁶ ................................................. G02B 6/12
[52] U.S. Cl. .................................. 385/2; 385/14; 385/27
[58] Field of Search ................................. 385/2, 8, 1, 16, 385/14, 9, 27, 31, 37, 132, 28; 359/245, 344, 246, 249, 282, 283, 324; 372/40, 43

[56] References Cited

U.S. PATENT DOCUMENTS

| | | | |
|---|---|---|---|
| 4,794,257 | 12/1988 | Baba et al. .......................... | 250/370.01 |
| 4,866,406 | 9/1989 | Minakata et al. ....................... | 359/315 |
| 5,173,955 | 12/1992 | Yamanishi et al. ......................... | 385/6 |
| 5,184,247 | 2/1993 | Schimpe .................... | 359/344 |
| 5,245,465 | 9/1993 | Tomita et al. .......................... | 359/246 |
| 5,339,369 | 8/1994 | Hopfer et al. ............................... | 385/2 |
| 5,394,491 | 2/1995 | Inone et al. ............................... | 385/16 |
| 5,548,668 | 8/1996 | Schaffner et al. .......................... | 385/1 |

OTHER PUBLICATIONS

M. Levy et al., "Integrated Optical Isolators with Sputter–Deposited Thin–Film Magnets", *IEEE Photonics Technology Letters*, vol. 8, No. 7, Jul. 1996, pp. 903–905.

*Primary Examiner*—Rodney Bovernick
*Assistant Examiner*—Ellen E. Kang
*Attorney, Agent, or Firm*—Sughrue, Mion, Zinn Macpeak & Seas, PLLC

[57] ABSTRACT

A waveguide-type optical isolator, which has: an optical waveguide which is formed a semiconductor material that absorbs only light with a specified wavelength; a pair of electrodes which are formed on the upper and lower surfaces of the optical waveguide; means for injecting a traveling-wave voltage pulse into the pair of electrodes; and an electric circuit which is connected with the pair of electrodes, wherein the electric circuit satisfies an impedance matching condition at a terminal of the optical waveguide; wherein the traveling-wave voltage pulse allows a non-absorption or amplfying region which travels with the traveling-wave voltage pulse to be formed in the optical waveguide.

6 Claims, 4 Drawing Sheets

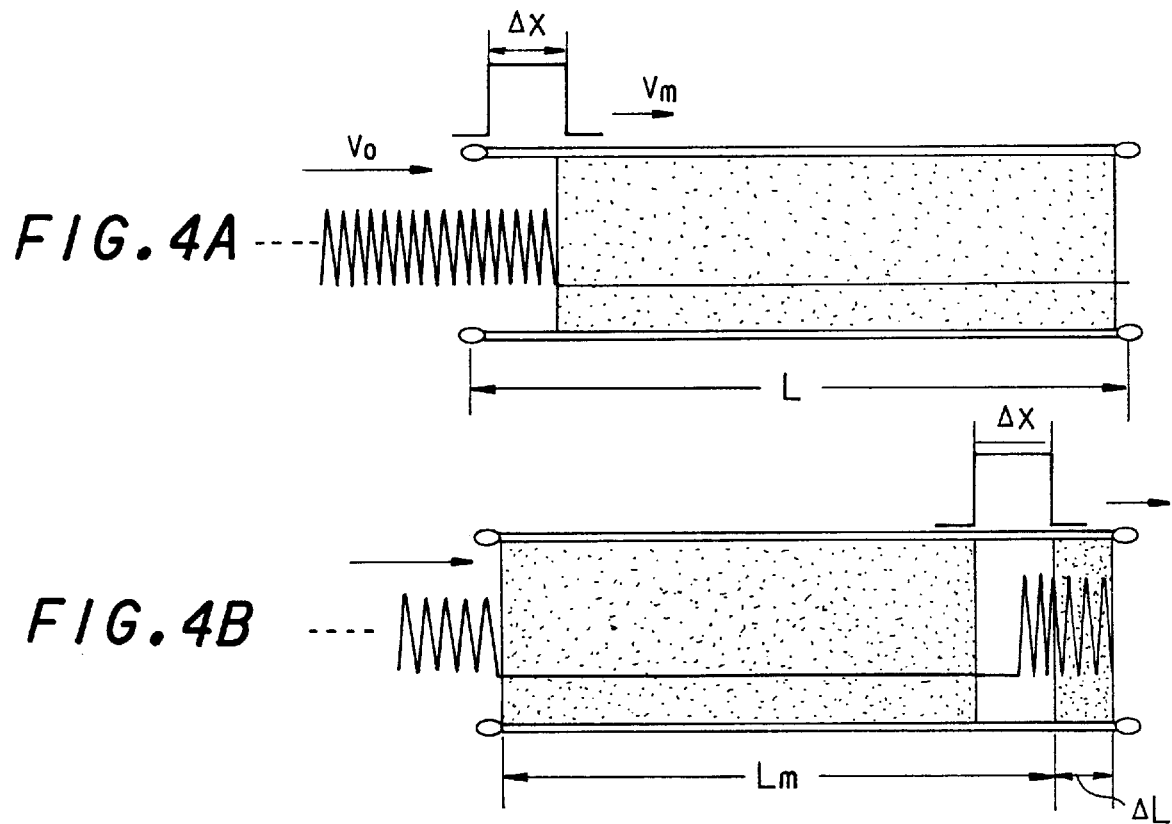
FIG. 4A
FIG. 4B
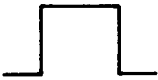 TRAVELING-WAVE VOLTAGE PULSE
 LIGHT WAVE

WAVEGUIDE-TYPE OPTICAL ISOLATOR AND METHOD FOR MAKING THE SAME

FIELD OF THE INVENTION

This invention relates to a waveguide-type optical isolator, and more particularly to, a waveguide-type optical isolate for preventing light in a waveguide from being reflected back into a semiconductor laser and relates to a method for making the isolator.

BACKGROUND OF THE INVENTION

Semiconductor lasers are widely used as a light source for ultra-high speed and long-distance optical communications. However, in conventional semiconductor lasers, there is a problem that, due to a very little light reflecting back from an optical fiber, noises occur in the semiconductor laser. Therefore, an optical isolator is indispensable for removing the light reflected back into the semiconductor laser. In general, the optical isolator is composed of a magneto-optic crystal with the Faraday effect and two optical polarizers which sandwich the magneto-optic crystal therebetween and whose polarization directions in transmission are shifted by 45°. In addition, such an optical isolator is composed of at least four components including a magnet.

However, since the conventional optical isolator has the complicated composition and requires many steps for processing materials and fabricating those components, it is costly and may be short of reliability or stability. Furthermore, it is impossible for the conventional optical isolator to be monolithically integrated with the semiconductor laser.

SUMMARY OF THE INVENTION

Accordingly, it is an object of the invention to provide an optical isolator which can be monolithically integrated with a semiconductor laser.

It is a further object of the invention to provide a method for making an optical isolator by which a monolithically integrated optical isolator can be easily made.

According to the invention, a waveguide-type optical isolator, comprises:

an optical waveguide which is formed of a semiconductor material that absorbs only light with a specified wavelength;

a pair of electrodes which are formed on the upper and lower surfaces of the optical waveguide;

means for injecting a traveling-wave voltage pulse into the pair of electrodes; and an electric circuit which is connected with the pair of electrodes, wherein the electric circuit satisfies an impedance matching condition at a terminal of the optical waveguide;

wherein the traveling-wave voltage pulse allows a non-absorption absorption or amplifying region which travels with the traveling-wave voltage pulse to be formed in the optical waveguide.

According to another aspect of the invention, a method for making a waveguide-type optical isolator, comprising the steps of:

layering in sequence an absorption layer and a buried layer on a substrate;

forming the absorption layer and the buried layer into a stripe-shaped optical waveguide; and forming a pair of electrodes on the upper and lower surfaces of the optical waveguide.

According to another feature of the invention, a waveguide-type optical isolator, comprises:

an optical waveguide having an absorption layer for absorbing a light of a specified wavelength the absorption layer extending from a light input end of the optical waveguide to a light output end thereof; and a light non-absorbing or amplifying region formed in the absorption layer, the light non-absorbing or amplifying region travelling along the absorption layer in the direction from the light input end to the light output end thereby allowing a light supplied to the light waveguide to be transmitted therethrough, while not allowing a light supplied to the light output end to be transmitted therethrough.

BRIEF DESCRIPTION OF THE DRAWINGS

The invention will be explained in more detail in conjunction with the appended drawings, wherein:

FIGS. 4A and 4B show traveling states of a traveling-wave voltage pulse in a waveguide-type optical isolator according to the invention.

DESCRIPTION OF THE PREFERRED EMBODIMENTS

Figure 1:
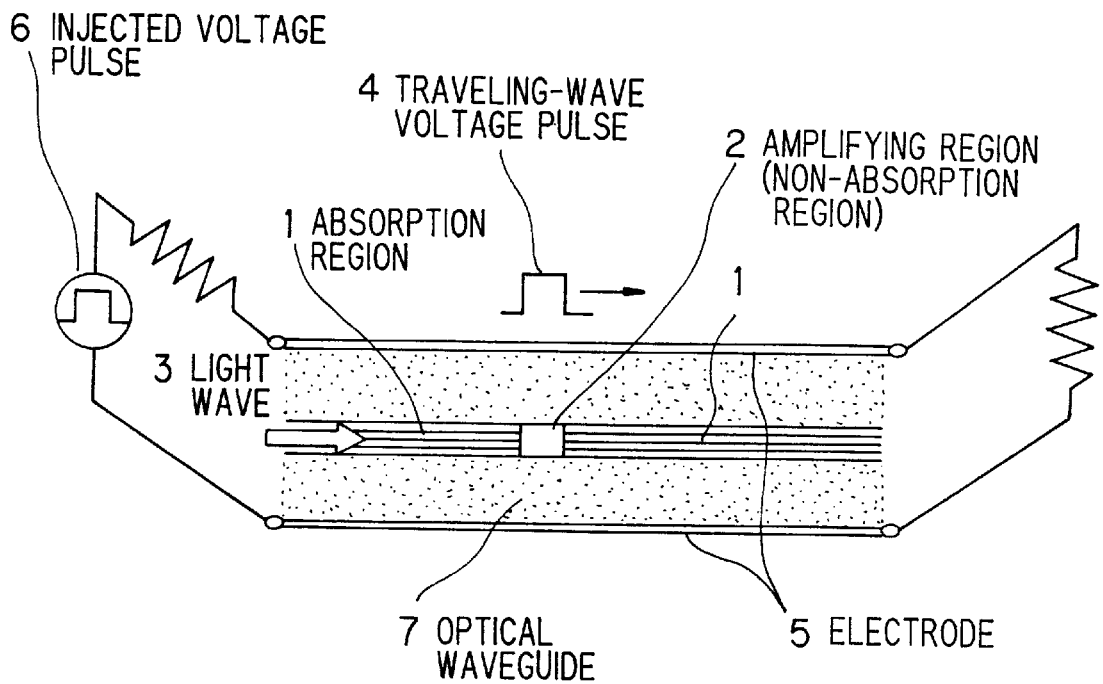
FIG. 1 shows a schematic composition of a waveguide-type optical isolator according to the invention.
Figure 2:
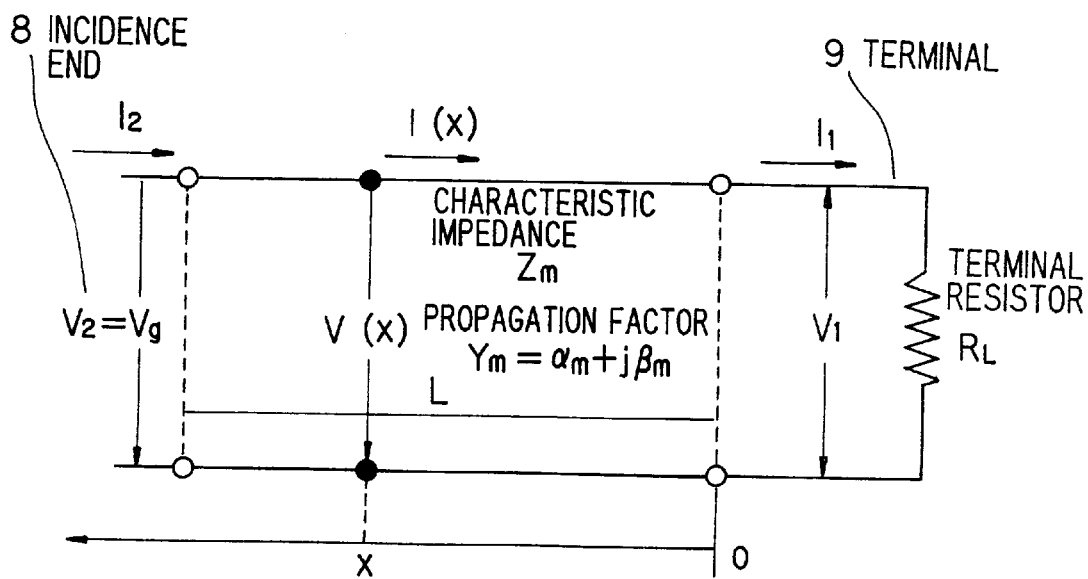
FIG. 2 shows an equivalent electronic circuit which corresponds to the composition in FIG. 1.

Before explaining a waveguide-type optical isolator in the preferred embodiment, the principle and function of the invention will be explained below. FIG. 1 shows a schematic composition of the invention. An optical isolator of the invention comprises an optical waveguide 7 which is formed of a semiconductor material that absorbs only a specified wavelength, electrodes 5 formed on the upper and lower surfaces of the optical waveguide 7 and an electric circuit which is connected with the electrodes 5 which is used as the transmission line of an injected voltage pulse 6. FIG. 2 shows an equivalent electronic circuit of the above arrangement. In FIG. 2, Zm and $R_L$ are a characteristic impedance and a terminal resistivity, respectively when regarded as a distributed parameter circuit. If an attenuation constant and a phase constant are $\alpha_m$ and $\beta_m$, respectively, a propagation factor $\gamma_m$ is given by:

$$\gamma_m = \alpha_m + j\beta_m$$

$V_1$ and $I_1$ represent a voltage and a current, respectively at a terminal 9 and $V_2$ and $I_2$ represent a voltage and a current, respectively at incidence end 8. L represents a device length and x represents a distance from reference point proximate to the terminal resistor $R_L$.

From the basic equation of a distributed constant circuit as to voltage and current, a voltage at an arbitrary point x of the distributed constant circuit, where the voltage at the incidence end, $V_2 = V_g$ is used, is given by:

$$V(x) = \frac{V_g}{(R_L + Z_m)e^{\gamma mL} + (R_L - Z_m)e^{-\gamma mL}}[(R_L + Z_m)e^{\gamma mx} + (R_L - Z_m)e^{-\gamma mx}] \quad (1)$$

If $V_g$ is a sine function of an angular frequency $\omega$, the phase constant $\beta_m$ of the propagation factor $\gamma_m$ is given by:

$$\beta_m = \frac{\omega}{c} n_m = \frac{\omega}{v_m} \quad (2)$$

where $v_m$ represents the propagation velocity of a traveling-wave voltage pulse, c represents the propagation velocity of an electromagnetic wave in free space and $n_m$ represents an effective refractive index to a voltage wave.

The first term of the right side of equation (1) indicates a traveling-wave voltage pulse which travels from the incidence end 8 to the terminal 9. The second term of the right side of equation (1) is interpreted as a traveling-wave voltage pulse which travels from the terminal 9 to the incidence end 8, i.e., a reflected wave. As understood from equation (1), if the impedance $R_L$ at the terminal 9 is equal to $Z_m$, the impedance matching can be perfectly obtained and therefore no reflected wave at the terminal 9 occurs. In this case, the voltage distribution is given by:

$$V(x) = V_g e^{-\gamma m(L-x)} \quad (3)$$

Namely, only the traveling-wave voltage pulse from the incidence end 8 to the terminal 9 can be obtained.

Figure 3:
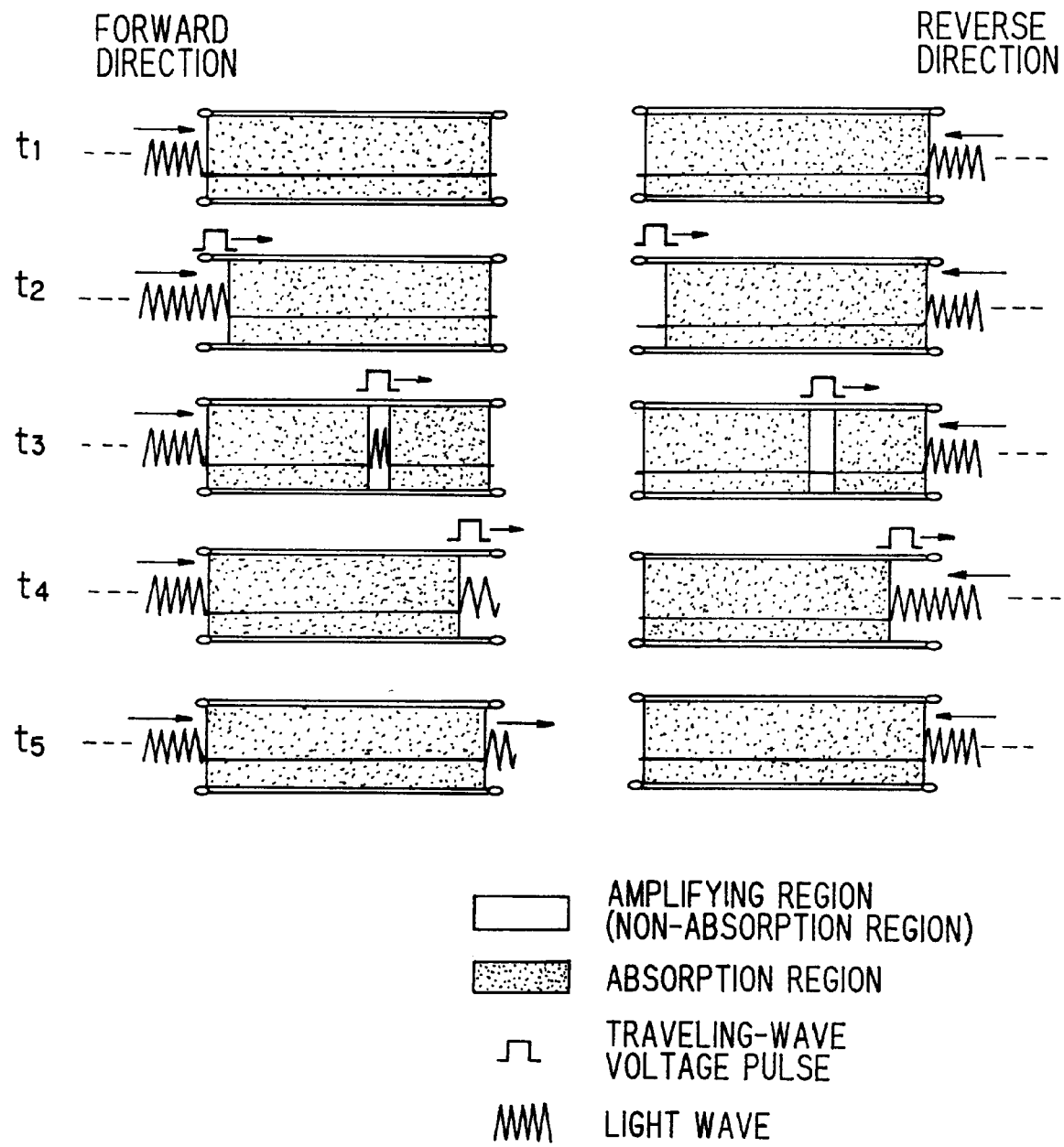
FIG. 3 shows an operational principle of a waveguide-type optical isolator according to the invention.

By supplying such a traveling-wave voltage pulse, the optical waveguide can serve as an optical isolator, whose operational principles are illustrated in FIG. 3. In FIG. 3, t1 to t5 are transition times in the case that a light wave is supplied from a forward direction. Here, the light wave supplied from the forward direction is set to have the same propagation direction and phase velocity as the traveling-wave voltage pulse. The comparative position of a traveling-wave voltage pulse to a traveling light wave is constant while the light wave travels in the waveguide. A light wave supplied simultaneously with the injected voltage pulse is synchronized with a non-absorption (amplifying) region formed by the traveling-wave voltage pulse to travel at the same speed to the output end.

On the other hand, a light wave supplied from a reverse direction is almost absorbed and therefore cannot be propagated to the emission end since it has the reverse propagation direction to the traveling-wave voltage pulse and the position of the traveling-wave voltage pulse to the traveling light wave is constant. Thus, only the light wave which travels in the same direction as the traveling-wave voltage pulse can be passed through and the light wave supplied from the reverse direction cannot be passed through due to the attenuation. Namely, the device of the invention can serve as an optical isolator.

When the phase velocities of a light wave and a traveling-wave voltage pulse are identical with each other, the comparative position of the traveling-wave voltage pulse to the traveling light wave is constant while the light wave travels through the device. However, in general, due to the difference (dispersion) of a dielectric constant between the frequency domain of a light wave and the frequency domain of a traveling-wave voltage pulse or due to the difference of waveguide structure (between an optical waveguide and a transmission line), the light wave and the traveling-wave voltage pulse propagate at speeds different from each other.

Namely, an equivalent refractive index $n_0$ of the light wave is different from an equivalent refractive index $n_m$ of the pulse wave supplied. Therefore, the position of the traveling-wave voltage pulse to the traveling light wave may be varied. As a result, the difference of wave surfaces of the traveling-wave voltage pulse and the light wave, which are simultaneously supplied to the input end, will occur and gradually increase in proportion to a propagation distance.

When the difference of time periods required for the light wave and the traveling-wave voltage pulse to pass through the device is sufficiently smaller than the varying period of the traveling-wave voltage pulse, the light supplied in the forward direction can be safely passed through. However, if this difference in time periods to pass through the device becomes large relative to the varying period of the traveling wave pulse, the light wave supplied may be shifted from the non-absorption region during propagation through the device; and become absorbed in the absorption region.

Here, if a traveling speed of the light wave is $v_0 (=c/n_0)$ and a length of the optical waveguide is L as illustrated in FIG. 4A, a time period $t_0$ required for the light wave to pass through the waveguide is equal to $n_0 L/c$. On the other hand, the traveling-wave voltage pulse with a width $\Delta x = \Delta t v_m$ travels at a speed of $v_m (=c/n_m)$ on the electrode. A distance $L_m$ travelled by the voltage pulse for a time period $t_0$ is equal to $v_m t_0$. For the time period $t_0$, the difference of the propagation distances of the light wave and the traveling-wave voltage pulse is given by:

$$\Delta L = |L - L_m| = |L - v_m t_0| = L \left| 1 - \frac{n_0}{n_m} \right| \quad (4)$$

As understood from FIG. 4B, if $\Delta L > \Delta x$ is satisfied, the light wave is shifted completely out of the non-absorption region and absorbed. To make half of the light wave which is input to the input end pass through to the output end, the next relation is required.

$$\Delta L < \frac{\Delta x}{2} = \frac{c \Delta t}{2 n_m} \quad (5)$$

From equation (4) and relation (5), the traveling-wave voltage pulse width to be required is determined by:

$$\Delta t > \frac{2L}{c} |n_m - n_0| \quad (6)$$

On the other hand, to suppress the light wave supplied in the reverse direction, a width $\Delta x$ or the traveling-wave voltage pulse should be smaller than half the electrode not to allow the entire waveguide to be a non-absorption region. Namely, the next relation should be satisfied.

$$\Delta t < \frac{L n_m}{2c} \quad (7)$$

Figure 5:
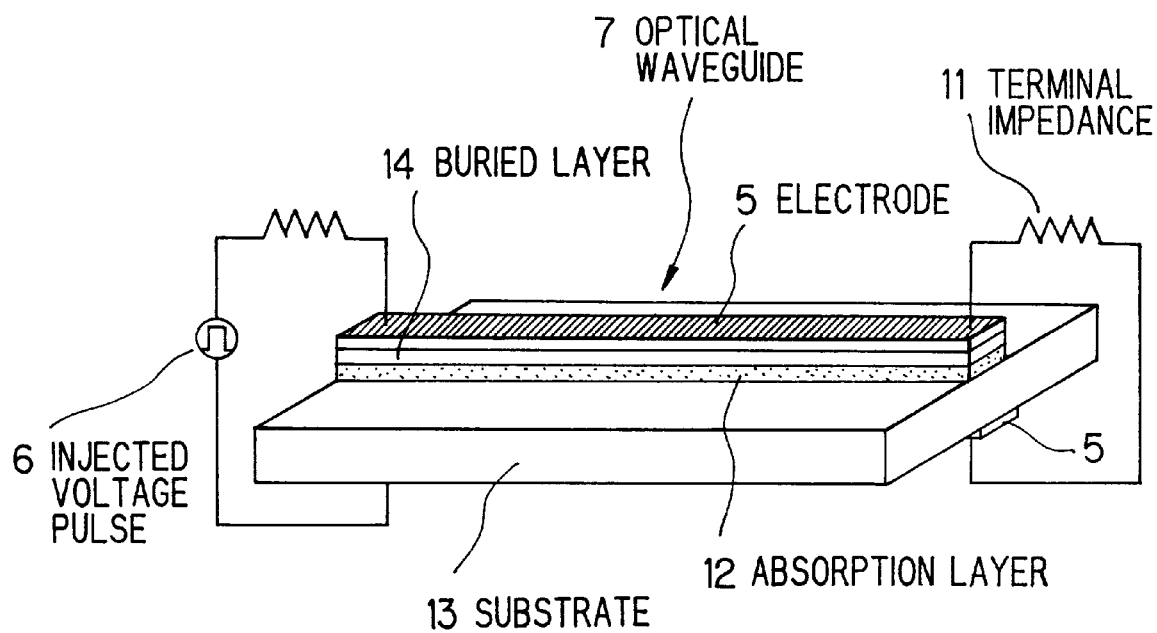
FIG. 5 is a schematic perspective view showing a waveguide-type optical isolator in a preferred embodiment according to the invention.

Next, an optical isolator in the preferred embodiment of the invention and a method for making the same will be explained in FIG. 5. In this embodiment, a 1.3 μm wavelength band device is formed and a InP system material which is monolithically integrated with a long wavelength semiconductor laser is used.

The method for making the optical isolator in this embodiment will be explained below. First, a 0.2 μm InGaAsP absorption layer 12 with a 1.3 μm band-gap wavelength composition and a 0.5 μm InP buried layer 14 are grown on a InP substrate 13. Then, by standard photolithography and etching, the InP buried layer 14 and the four-element absorption layer 12 are formed into a ridge-stripe waveguide with a width of 3 μm. Thereafter, stripe electrodes 5 are vapor-deposited on the upper and lower surfaces of the ridge waveguide.

If the device length is 1 mm, the characteristic impedance is about 50 Ω. The longer the device length, the greater isolation characteristics can be obtained. However, the longer the device length, the greater the waveguide loss. If the characteristic impedance of the electrode line is designed to be 50 Ω, a terminal impedance 11 of 50 Ω is, as shown in FIG. 5, provided to match with this, and the interconnection is provided such that the electrodes 5 are used as a transmission circuit. In the case of TnP, $n_0$=3.16 and $n_m$=2.59 are given, as seen from relations (6) and (7), a width of the traveling-wave voltage pulse to the device with a length of 1 mm needs to be 3.80 ps to 4.32 ps.

Though the optical isolator in this embodiment is structured to operate in the 1.3 μm band, it may be monolithically integrated with a 1.5 μm wavelength band semiconductor laser by using a InGaAsP absorption layer 12 with a 1.5 μm band-gap wavelength composition.

This embodiment is characterized in that the impedance matching condition is satisfied suppress a reflecting wave at the terminal. By injecting the traveling-wave voltage pulse into the absorption layer 12 to form the traveling non-absorption (or amplifying) region, part of the light wave which is supplied to the optical waveguide 7 in the same direction as the traveling direction of the non-absorption region can be propagated to the emission end with the non-absorption (or amplifying) region, while absorbing the light wave supplied to the optical waveguide 7 in the reverse direction to the traveling direction of the non-absorption region. Thus, the device in this embodiment can serve as an optical isolator.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A waveguide-type optical isolator, comprising:

an optical waveguide having a length L and which is formed of a semiconductor material that absorbs only light with a specified wavelength;

a pair of electrodes which are respectively formed on upper and lower surfaces of said optical waveguide each electrode formed along the entire length L of said optical waveguide;

means for injecting a traveling-wave voltage pulse into said pair of electrodes; and an electric circuit which is connected with said pair of electrodes, wherein said electric circuit satisfies an impedance matching condition at a terminal of said optical waveguide;

wherein said traveling-wave voltage pulse allows a non-absorption or amplifying region which travels with said traveling-wave voltage pulse to be formed in said optical waveguide, wherein:

said traveling-wave voltage pulse has a width Δt satisfying the following conditions:

$$\Delta t > (2L/c)(|n_m - n_o|)$$

and $$\Delta t < (Ln_m)/(2c)$$

where c=the velocity of an electromagnetic wave in free space;
$n_m$=equivalent refractive index for the traveling wave;
$n_0$=equivalent refractive index for an optical signal applied to the waveguide.

2. A method for making a waveguide-type optical isolator comprising the steps of:

layering in sequence an absorption layer and a buried layer on a substrate;

forming said absorption layer and said buried layer into a stripe-shaped optical waveguide having a length L; and forming a pair of electrodes respectively on upper and lower surfaces of said optical waveguide, each of said electrodes being formed along the entire length L of said optical waveguide; and applying a traveling wave voltage pulse into said pair of electrodes to form a non-absorption region in said absorption layer which travels with said traveling wave voltage pulse.

3. The method for making a waveguide-type optical isolator of claim 2, wherein said traveling wave voltage pulse has a width Δt satisfying the following conditions:

$$\Delta t > \frac{2L}{c}\left|n_m - n_0\right|$$
and
$$\Delta t < \frac{Ln_m}{2c}$$

where c=the velocity of an electromagnetic wave in free space;
$n_m$=equivalent refractive index for the traveling wave;
$n_o$=equivalent refractive index for an optical signal applied to the waveguide.

4. A waveguide-type optical isolator comprising;

an optical waveguide having an absorption layer for absorbing light of a specified wavelength, said absorption layer extending from a light input end of said optical waveguide to a light output end thereof;

a light non-absorbing or amplifying region formed in said absorption layer, said light non-absorbing or amplifying region travelling along said absorption layer in the direction from said light input end to said light output end, thereby allowing a light supplied to said optical waveguide to be transmitted therethrough, while not allowing a light supplied to said light output end to be transmitted therethrough; and an upper electrode disposed on an upper surface of said optical waveguide and a lower electrode disposed on a lower surface of said optical waveguide for conducting a traveling wave voltage pulse to form said light non-absorbing or amplifying region, said traveling wave pulse having a width Δt satisfying the following conditions:

$$\Delta t > \frac{2L}{c}\left|n_m - n_o\right|$$
and
$$\Delta t < \frac{Ln_m}{2c}$$

where L=a length for the waveguide;
c=the velocity of an electromagnetic wave in free space;
$n_m$=equivalent refractive index for the traveling wave;
$n_o$=equivalent refractive index for an optical signal applied to the waveguide.

5. A waveguide-type optical isolator, comprising:

an optical waveguide having a length L and which is formed of a semiconductor material that absorbs only light with a specified wavelength;

a pair of electrodes which are respectively formed on upper and lower surfaces of said optical waveguide each electrode formed along the entire length L of said optical waveguide;

means for injecting a traveling-wave voltage pulse into said pair of electrodes; and an electric circuit which is connected with said pair of electrodes, wherein said electric circuit satisfies an impedance matching condition at a terminal of said optical waveguide;

wherein said traveling-wave voltage pulse allows a non-absorption or amplifying region which travels with said traveling-wave voltage pulse to be formed in said optical waveguide, wherein:

said traveling-wave voltage pulse has a width $\Delta t$ satisfying the following condition:

$\Delta t < (Ln_m)/(2c)$ where c=the velocity of an electromagnetic wave in free space;
$n_m$=equivalent refractive index for the traveling wave.

6. A waveguide-type optical isolator comprising:

an optical waveguide having an absorption layer for absorbing light of a specified wavelength, said absorption layer extending from a light input end of said optical waveguide to a light output end thereof; and a light non-absorbing or amplifying region formed in said absorption layer, said light non-absorbing or amplifying region travelling along said absorption layer in the direction from said light input end to said light output end, thereby allowing a light supplied to said optical waveguide to be transmitted therethrough, while not allowing a light supplied to said light output end to be transmitted therethrough;

an upper electrode disposed on an upper surface of said optical waveguide and a lower electrode disposed on a lower surface of said optical waveguide for conducting a traveling wave voltage pulse to form said light non-absorbing or amplifying region, said traveling wave pulse having a width $\Delta t$ satisfying the following condition:

$\Delta t < (Ln_m)/(2c)$ where
c=the velocity of an electromagnetic wave in free space;
$n_m$=equivalent refractive index for the traveling wave.

* * * * *